(12) United States Patent
Adkins et al.

(10) Patent No.: US 8,987,396 B2
(45) Date of Patent: *Mar. 24, 2015

(54) ACTIVE POLYMER POLYOLS AND A PROCESS FOR THEIR PRODUCTION

(71) Applicant: Bayer MaterialScience, LLC, Pittsburgh, PA (US)

(72) Inventors: Rick L. Adkins, Canonsburg, PA (US); Jose F. Pazos, Charleston, WV (US); Stanley L. Hager, Cross Lanes, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/836,583

(22) Filed: Mar. 15, 2013

(65) Prior Publication Data

US 2014/0275471 A1    Sep. 18, 2014

(51) Int. Cl.
C08F 2/00 (2006.01)
C08F 4/00 (2006.01)
C08F 251/00 (2006.01)
C08G 65/34 (2006.01)

(52) U.S. Cl.
CPC ................................. C08G 65/34 (2013.01)
USPC ............ 526/222; 526/223; 526/225; 525/263

(58) Field of Classification Search
CPC ..... C08F 283/06; C08F 290/14; C08F 290/06
USPC ........................ 526/222, 223, 225; 525/263
See application file for complete search history.

(56) References Cited

U.S. PATENT DOCUMENTS

| | | | |
|---|---|---|---|
| 5,011,908 A | 4/1991 | Hager | |
| 5,059,641 A | 10/1991 | Hayes et al. | |
| 6,172,164 B1 * | 1/2001 | Davis et al. | 525/263 |
| 8,383,733 B2 * | 2/2013 | Adkins et al. | 525/263 |
| 2004/0220290 A1 | 11/2004 | Grimm et al. | |
| 2011/0086996 A1 * | 4/2011 | Nakada et al. | 528/73 |
| 2013/0059936 A1 | 3/2013 | Sasaki et al. | |

FOREIGN PATENT DOCUMENTS

JP          6228247          8/1994

\* cited by examiner

*Primary Examiner* — William Cheung
(74) *Attorney, Agent, or Firm* — N. Denise Brown; Lyndanne M. Whalen

(57) ABSTRACT

Polymer polyols having a solids content of greater than 40 wt. %, a total ethylene oxide content of up to 25 wt. %, and a viscosity at 25° C. of less than 15,000 centistokes are produced by reacting (1) a base polyol having active hydrogen atoms with an ethylene oxide content of from 15 to 40 wt. % that has been formed in the presence of a double metal cyanide (DMC) catalyst, (2) one or more unsaturated monomers, (3) at least one radical initiator, optionally (4) a preformed stabilizer and optionally (5) a chain transfer agent. These polymer polyols (PMPOs) are useful in the preparation of polyurethane foams and elastomers.

17 Claims, No Drawings

ACTIVE POLYMER POLYOLS AND A PROCESS FOR THEIR PRODUCTION

FIELD OF THE INVENTION

The present invention relates in general, to polymer polyols, and more specifically, to polymer polyols having solids contents greater than 40 wt. % and to a process for preparing such polymer polyols (PMPO) by reacting (1) a base polyol having active hydrogen atoms and ethylene oxide content of from 15 to 40 wt. % formed in the presence of a double metal cyanide (DMC) catalyst and (2) at least one unsaturated monomer in the presence of (3) at least one radical initiator.

BACKGROUND OF THE INVENTION

Polymer polyols (PMPOs) are used in the preparation of polyurethane foams and elastomers and are extensively used on a commercial scale. Polyurethane foams made from such polymer polyols have a wide variety of uses. The two major types of polyurethane foams are slabstock and molded foam. Polyurethane slabstock foams are used in carpet, furniture and bedding applications. Molded polyurethane foams are used in the automotive industry for a broad range of applications.

Polymer polyols are typically produced by polymerizing one or more ethylenically unsaturated monomers dissolved or dispersed in a prepared polyol in the presence of a free radical catalyst to form a stable dispersion of polymer particles in the polyol. Typically, polymer polyols used to produce polyurethane foams having higher load-bearing properties than those produced from unmodified polyols were prepared using acrylonitrile monomer; however, many of those polymer polyols have undesirably high viscosities.

Polyurethane foams having high load-bearing properties are predominantly produced using polymer polyols that are prepared from a high styrene content monomer mixture (for example, 65 to 75 percent styrene). However, polymer polyols produced from such high styrene monomer mixtures often fail to satisfy the ever more demanding needs of industry, including acceptable viscosity, strict stability requirements and increased load-bearing properties.

Stability and low viscosity of polymer polyols are of increasing importance to polyurethane foam manufacturers due to the development of sophisticated, high speed and large volume equipment and systems for handling, mixing and reacting polyurethane-forming ingredients. Polymer polyols must meet certain minimum polymer particle size requirements to avoid plugging or fouling filters, pumps and other parts of such foam processing equipment in relatively short periods of time.

Numerous attempts have been made to produce polymer polyols that will satisfy the above criteria. In particular, Japanese laid-open patent application, Kokai No. 6-228247, teaches a semibatch process for making a polymer polyol by the sequential addition of oxide monomer and its polymerization followed by addition of vinyl monomers and their polymerization in the same reactor. Although the Japanese laid-open application teaches that removal of the DMC catalyst is not required, it fails to even suggest that the processing steps could be anything other than sequential. Thus, while one skilled in the art might infer from reading Kokai '247 that DMC catalysts do not interfere with free radical polymerization, Kokai '247 provides no guidance concerning whether free radical polymerization interferes with DMC catalysis.

U.S. Pat. No. 5,059,641, issued to Hayes et al., discloses very low viscosity PMPOs having high styrene/acrylonitrile ratios and good stability which are produced with epoxy-modified polyols as dispersants. The epoxy-modified polyol dispersant may be made by one of three methods: (1) adding the epoxy resin internally to the modified polyol, (2) capping or coupling a polyol not containing an epoxy resin with such a resin, or (3) providing the epoxy resin both internally to the polyol and as a cap or coupler. Epoxy-modified polyols having a hydroxyl to epoxy ratio of about 8 or less, made by one of these techniques, are said to be superior dispersants and provide polymer polyols having higher styrene contents, improved stability and viscosity properties.

Numerous patents disclose the continuous and semi-batch preparation of PMPOs, including processes where the base polyol is a DMC-catalyzed polyol having a molecular weight greater than 3500 Da.

It would, however, be advantageous to be able to produce a low viscosity, polymer polyol having a solids content of greater than 40 wt. % from a low molecular weight polyol having a high hydroxyl content that has been produced with a DMC (double metal cyanide) catalyst.

SUMMARY OF THE INVENTION

It is an object of the present invention to provide a polymer polyol having a solids content of greater than 40 wt. %, a total ethylene oxide content of up to 25 wt. %, and a viscosity at 25° C. of less than 15,000 centistokes.

It is another object of the present invention to provide a process for the production of a polymer polyol having a solids content of greater than 40 wt. %, a total ethylene oxide content of up to 25 wt. %, and a viscosity at 25° C. of less than 15,000 centistokes.

It is a further object of the present invention to produce a polymer polyol having a solids content of greater than 40%, a viscosity at 25° C. of less than 15,000 centistokes and a total ethylene oxide content of up to 25% formed from a base polyol that has been produced with a DMC (double metal cyanide) catalyst which starter has a molecular weight of less than 3500 Da.

These and other objects which will be apparent to those skilled in the art are accomplished by reacting (1) a base polyol having active hydrogen atoms with an ethylene oxide content of from 15 to 40 wt. % that has been formed in the presence of a double metal cyanide (DMC) catalyst, (2) one or more unsaturated monomers, (3) at least one radical initiator, optionally (4) a preformed stabilizer and optionally (5) a chain transfer agent.

The process of the present invention may be continuous or semibatch and the polymer polyols made by this process may be used in the preparation of polyurethane foams and elastomers.

DETAILED DESCRIPTION OF THE INVENTION

The present invention will now be described for purposes of illustration and not limitation. Except in the operating examples, or where otherwise indicated, all numbers expressing quantities, percentages, hydroxyl numbers, functionalities and so forth in the specification are to be understood as being modified in all instances by the term "about."

The present invention provides a process for preparing a polymer polyol (PMPO) in which at least one base polyol containing active hydrogen atoms that has been formed in the presence of a double metal cyanide (DMC) catalyst, at least one unsaturated monomer, at least one radical initiator, optionally, at least one pre-formed stabilizer, and optionally, a chain transfer agent are reacted to form a high solids, low viscosity polymer polyol (PMPO).

The base polyol used to produce the polymer polyols of the present invention must have active hydrogen atoms, a molecular weight of less than 3500 Da, preferably, less than 3,000 Da, most preferably, less than 2800 Da, a total ethylene oxide content of from 15 to 40%, preferably, from 18 to 35%, most preferably, from 20 to 30%, and have been produced with a DMC catalyst.

Suitable base polyols may be prepared from starter compounds in accordance with any of the known DMC-catalyzed processes.

In one process useful for the production of base polyols suitable for use in producing the polymer polyols of the present invention, starter polyol is charged to a reactor along with a double metal cyanide catalyst. This mixture is heated with nitrogen stripping of the polyol and catalyst blend. At least one alkylene oxide is charged to the reactor to activate the catalyst. After activation, the reactor temperature is maintained at a temperature of from 80 to 160° C. and at least one alkylene oxide is added to the reactor over a period of several hours. After digestion, the polyether is stripped to remove any unreacted alkylene oxide, cooled and discharged.

Suitable starter compounds useful for producing the base polyols of the present invention include, but are not limited to, compounds having number average molecular weights from 18 to 1000, more preferably, from 62 to 700, and having from 1 to 8 hydroxyl groups. Examples of such starter compounds include, but are not limited to, polyoxypropylene polyols, polyoxyethylene polyols, polytetatramethylene ether glycols, glycerol, propoxylated glycerols, propylene glycol, ethylene glycol, tripropylene glycol, trimethylol propane alkoxylated allylic alcohols, bisphenol A, pentaerythritol, sorbitol, sucrose, degraded starch, water and mixtures thereof.

The alkylene oxides useful in the present process include, but are not limited to, ethylene oxide, propylene oxide, oxetane, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. It is generally undesirable to employ ethylene oxide alone, but mixtures of propylene oxide and ethylene oxide with high ethylene oxide content, i.e., up to 85 mol percent, may be used effectively. Propylene oxide or mixtures of propylene oxide with ethylene oxide or another alkylene oxide are preferred. Other polymerizable monomers may be used as well, e.g., anhydrides and other monomers as disclosed in U.S. Pat. Nos. 3,404,109, 5,145,883 and 3,538,043.

The process of the present invention may employ any double metal cyanide (DMC) catalyst. Suitable double metal cyanide (DMC) catalysts are well known to those skilled in the art. Double metal cyanide complex (DMC) catalysts are non-stoichiometric complexes of a low molecular weight organic complexing agent and optionally other complexing agents with a double metal cyanide salt, e.g., zinc hexacyanocobaltate.

Exemplary double metal cyanide (DMC) complex catalysts include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. More preferred double metal cyanide (DMC) catalysts are those capable of preparing "ultra-low" unsaturation polyether polyols. Such catalysts are disclosed in U.S. Pat. Nos. 5,470,813, 5,482,908 and 5,545,601. The most DMC catalysts are those zinc hexacyanocobaltate catalysts prepared by the methods described in U.S. Pat. No. 5,482,908.

The catalyst concentration is chosen so as to ensure a good control of the polyoxyalkylation reaction under the given reaction conditions. The catalyst concentration is preferably in the range from 0.0005 wt. % to 1 wt. %, more preferably in the range from 0.001 wt. % to 0.1 wt. %, most preferably in the range from 0.001 to 0.01 wt. %, based on the amount of polyether polyol to be produced. The catalyst may be present in the process of the present invention in an amount ranging between any combination of these values, inclusive of the recited values.

Suitable unsaturated monomers for use in the inventive process include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, nitrostyrene, N,N-dimethylaminostyrene, acetoxystyrene, including halogenated styrenes, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethyoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethylether, vinyl 2-ethylmercaptoethyl ether, vinyl methyl ketone, vinyl ethyl ketone, vinyl phenyl ketone, vinyl ethyl sulfide, vinyl ethyl sulfone. N-methyl-N-vinyl acetamide, N-vinylpyrrolidone, vinyl imidazole, divinyl sulfide, divinyl sulfoxide, divinyl sulfone, sodium vinyl imidazole, divinyl sulfide, divinyl sulfoxide, divinyl sulfone, sodium vinyl sulfonate, methyl vinyl sulfonate. N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, ally alcohol, glycol monoesters of itaconic acid, vinyl pyridine, maleic anhydride, maleimide. N-substituted maleimides, such as N-phenylmaleimide and the like. Preferred unsaturated monomers in the present invention are both styrene and acrylonitrile.

The amount of unsaturated monomer(s) fed to the reactor is selected to achieve the desired polymer solids content in the final polymer polyol product. The solids level in the polymer polyols of the present invention is at least 40 wt. %, generally ranging from 40 to 60 wt. %, preferably from 41 to 58 wt. %, most preferably from 45 to 55 wt. %, based on the total weight of the components. If a lower solids content polymer polyol is desired, the solids content may be lowered by dilution of the higher solids polyol with further amounts of the same base polyol or other non-polymer polyol, or by blending with a polymer polyol of lesser solids content.

Preferred radical initiators useful in the production of the polymer polyols of the present invention include the free radical type of vinyl polymerization initiators, such as peroxides and azo compounds. Specific examples include 2,2'-azo-bis-isobutyronitrile (AIBN), 2,2'-azo-bis(2-methylbutane-nitrile), dibenzoyl peroxide, lauroyl peroxide, di-t-butyl peroxide, diisopropyl peroxide carbonate, t-butyl peroxy-2-ethylhexanoate, t-amyl peroxypivalate, t-butylperneodecanoate, t-butylperbenzoate, t-butyl percrotonate, t-butyl perisobutyrate, and di-t-butyl perphthalate.

The free radical initiator concentration in the formulation is not critical and can be varied within wide limits. As a representative range, the concentration can vary from 0.01 to 5.0 wt. % or greater, based on the total weight of the components. The free radical initiator and temperature should be selected so that the initiator has a reasonable rate of decomposition with respect to the hold-up time in the reactor for a continuous flow reactor or the feed time for a semi-batch reactor.

The process of the present invention may optionally include one or more polymer polyol (PMPO) stabilizers. Suitable stabilizers are those known in the art which stabilize polymer polyols prepared by traditional methods. The stabilizer may be free of induced unsaturation such as those disclosed in U.S. Pat. No. 5,059,541. The stabilizer may contain reactive induced unsaturation which may be prepared by the reaction of the selected reactive unsaturated compound with a polyol. The terminology "reactive induced unsaturated compound," refers to any compound capable of forming an adduct with a polyol, either directly or indirectly, and having carbon-to-carbon double bonds which are adequately reactive with the particular monomer system being utilized. More specifically, compounds containing α,β-unsaturation are preferred. Suitable compounds satisfying this criteria include the maleates, fumarates, acrylates, and methacrylates. Although not α,β-unsaturated compounds, polyol adducts formed from substituted vinyl benzenes such as chloromethylstyrene likewise may be utilized. Illustrative examples of suitable α,β-unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydrides, methacroyl chloride and glycidyl methacrylate. The level of ethylenic unsaturation in the precursor stabilizer may vary widely. The minimum and maximum levels of unsaturation are both constricted by the dispersion stability that the precursor stabilizer is capable of imparting to the polymer polyol composition. The specific level of unsaturation utilized will further depend on the molecular weight of the polyol used to prepare the precursor stabilizer. More particularly, unsaturation levels of at least 0.04 meq/gm, up to 0.10 meq/gm are particularly suitable. The stabilizer may also be a preformed stabilizer or contain solids which act as "seeds". Examples of preformed stabilizers and "seeds" are described in U.S. Pat. Nos. 5,488,086; 6,013,731; 5,990,185; 6,455,603; 5,814,699; 5,196,476; 6,780,932; and 8,017,664.

The polymer polyol production process of the present invention may be carried out on a continuous, semi-batch or batch basis in accordance with techniques known to those skilled in the art.

The inventive process may also be carried out in the presence of an organic solvent, reaction moderator, and/or chain transfer agent. Examples of these materials include, but are not limited to, benzene, toluene, ethylbenzene, xylene, hexane, methanol, ethanol, propanol, isopropanol, mercaptans such as dodecylmercaptan, halogenated hydrocarbons, particularly those containing bromine and/or iodine, and the like and enol-ethers.

Following polymerization, volatile constituents, in particular those from any solvent and residues of monomers are preferably stripped from the product by vacuum distillation, optionally, in a thin layer or falling film evaporator. The monomer-free product may be used as is, or may be filtered to remove any large particles that may have been created.

The polymer polyols made by the inventive process are suitable for the preparation of polyurethane foams and elastomers.

EXAMPLES

The present invention is further illustrated, but is not to be limited, by the following examples.

General Process for Preparation of the Base Polyols

Starter polyol was charged to a reactor along with 0.6-1.2 g of a double metal cyanide catalyst (100 ppm) prepared according to the procedure disclosed in U.S. Pat. No. 5,482,908. This mixture was heated to 130° C. with nitrogen stripping of the polyol and catalyst blend. Propylene oxide and/or ethylene oxide was/were charged to activate the catalyst. After activation, the reactor temperature was maintained at 130° C. and propylene oxide and/or ethylene oxide was/were added over a 2.5-4 hour period. After digestion at 130° C. for 0.5 hours, the polyether was stripped to remove any unreacted propylene oxide or ethylene oxide, cooled and discharged.

Base Polyol A: A 425 molecular weight polypropylene glycol (PPG) starter (12 wt. %, based on final product weight) was added to a 1-L stainless steel reactor. After initiation with propylene oxide, propylene oxide (PO) was fed to the reactor until the desired weight concentration was reached. The oxide feed was then switched from PO to ethylene oxide (EO). After the EO feed was complete, the reaction mixture was digested and vacuum stripped to give a 1000 molecular weight (MW) diol with a 20% EO cap, a viscosity of 209 cSt, an OH# of 111, and a primary hydroxyl content of 63.5%.

Base Polyol B: Using the above-described general procedure, a 760 molecular weight polypropylene glycol (PPG) starter was treated with a co-feed of 10% EO and 90% PO until the desired weight concentration was reached. The EO/PO co-feed was then switched to a 100% EO feed to give a 1000 MW diol with a 20% EO cap (total EO=22.9% of final product), a viscosity of 758 cSt, an OH# of 74, and a primary hydroxyl content of 73.6%.

Base Polyol C: Using the above-described general procedure, a 760 molecular weight PPG starter was treated with a co-feed of 5% EO, and 95% PO until the desired weight concentration was reached. The 5% EO/95% PO co-feed was then switched to a 95% EO and 5% PO feed to give a 2000 MW diol with a 20% EO tip (total EO=26.3% of final product), a viscosity of 344 cSt, an OH# of 56, and a primary hydroxyl content of 50.5%.

Base Polyol D: Using the above-described general procedure, a 760 molecular weight PPG starter was treated with a co-feed of 15% EO and 85% PO until the PO concentration reached 67.5%. Then the EO feed was increased to 92% to give a 2400 MW diol with a 26.7% EO tip (total EO=26.7% of final product), a viscosity of 430 cSt, an OH# of 47, and a primary hydroxyl content of 69.2%.

Base Polyol E: Using the above-described general procedure, a 760 molecular weight PPG starter was treated with a co-feed of 5% EO and 95% PO until the desired weight concentration was reached. The 5% EO/95% PO co-feed was then switched to a 95% EO and 5% PO feed to give a 2500 MW diol with a 20% EO tip (total EO=20% of final product), a viscosity of 450 cSt, an OH# of 43, and a primary hydroxyl content of 53.8%.

Base Polyol F: Using the above-described general procedure, a 760 molecular weight PPG starter was treated with a co-feed of 15% EO and 85% PO until the PO concentration reached 67.5%. Then the EO feed was increased to 100% to give a 2800 MW dial with a 31% EO tip (total EO=31% of final product), a viscosity of 821 cSt, an OH# of 41, and a primary hydroxyl content of 75.7%.

The following components were used to prepare the macromers and preformed stabilizers from which the polymer polyols described in Table 2 were produced:

Polyol A: a propylene oxide adduct of sorbitol, containing an 8% ethylene oxide cap, having a hydroxyl number of 28 and a functionality of 6.

Polyol B: a propylene oxide adduct of sorbitol, containing a 16% ethylene oxide cap, having a hydroxyl number of 28 and a functionality of 6.

NCO A: Diphenylmethane diisocyanate (MDI) with a % NCO of approximately 33.6% which is commercially available from Bayer MaterialScience under the name Mondur ML.

CTA: Isopropanol, a chain transfer agent.

STY: styrene

ACN: acrylonitrile

TMI: Isopropenyl dimethyl benzyl isocyanate (an unsaturated aliphatic isocyanate) sold under the name TMI® by Cytec Industries.

TBPEH: tert-butylperoxy-2-ethylhexanoate, commercially available as Trigonox 21S from AkzoNobel.

AIBN: 2,2'-azobisisobutyronitrile, a free radical polymerization initiator commercially available as VAZO 64 from E.I. DuPont de Nemours and Co.

The properties for polymer polyols produced in these Examples and for the components from which these polymer polyols were produced were determined as follows:

Viscosity: Viscosities were measured by Canon-Fenske kinematic viscometer (centistokes cSt at 25° C.)

Filterability Test Filterability was determined by diluting one part by weight sample (e.g., 200 grams) of polymer polyol with two parts by weight anhydrous isopropanol (e.g., 400 grams) to remove any viscosity-imposed limitations and using a fixed quantity of material relative to a fixed cross-sectional area of screen (e.g., 1⅛ in. diameter), such that all of the polymer polyol and isopropanol solution passed by gravity through a 150-mesh. The 150-mesh screen had a square mesh with average mesh opening of 105 microns and was a "Standard Tyler" 150 square-mesh screen. The amount of sample which passed through the screen within is reported in Table 2 in a percentage. A value of 100 percent indicates that over 99 weight percent passed through the screen.

Macromer Preparation

Macromer A: Prepared by heating Polyol A (100 parts), TMI (2 parts), and 100 ppm bismuth neodecanoate catalyst at 75° C. for 4 hours.

Macromer B: Prepared by heating Polyol B (100 parts), TMI (2 parts), NCO A (1.5 parts) and 100 ppm bismuth neodecanoate catalyst at 75° C. for 4 hours.

General Process for the Production of Pre-Formed Stabilizer (PFS):

The procedure for the preparation of pre-formed stabilizers (PFS) made from Macromers A, and B to give PFS A and B, respectively was as follows. Each of the pre-formed stabilizers was prepared in a two-stage reaction system made up of a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120° C. The product from the second-stage reactor overflowed continuously through a pressure regulator designed to control the pressure in each stage at 65 psig. The pre-formed stabilizer then passed through a cooler and into a collection vessel. The formulations used for the pre-formed stabilizers are listed in Table 1, where the component concentrations are based on the total feed.

TABLE 1

Preformed Stabilizer Compositions:

| | PFS A | PFS B |
|---|---|---|
| CTA type | Isopropanol | Isopropanol |
| CTA in feed, wt. % | 30-80% | 30-80% |
| Macromer | A | B |
| Macromer in feed, wt. % | 10-40% | 10-40% |
| Monomers in feed, wt. % | 10-30% | 10-30% |
| TBPEH concentration, wt. % | 0.1-2% | 0.1-2% |

Polymer Polyol (PMPO) Preparation:

Polymer polyols were made from pre-formed stabilizers A and B. Each of the polymer polyols was prepared in a two-stage reaction system composed of a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115° C. The product from the second-stage reactor overflowed continuously through a pressure regulator designed to control the pressure in each stage at 45 psig. The polymer polyol then passed through a cooler and into a collection vessel. The crude product was vacuum stripped to remove volatiles. The wt. % total polymer in the product was calculated from the concentrations of monomers measured in the crude polymer polyol before stripping. The materials used, the amounts of the materials used and the properties of the products are reported in Table 2.

TABLE 2

| | Example | | | | | | |
|---|---|---|---|---|---|---|---|
| | 1 | 2 | 3 | 4 | 5 | 6 | 7 |
| PMPO Preparation Conditions: | | | | | | | |
| Initiator (AIBN) in feed, wt. % | 0.3 | 0.3 | 0.3 | 0.3 | 0.3 | 0.3 | 0.3 |

TABLE 2-continued

|  | Example | | | | | | |
|---|---|---|---|---|---|---|---|
|  | 1 | 2 | 3 | 4 | 5 | 6 | 7 |
| Base polyol | A | A | B | C | D | E | F |
| Base polyol in feed, wt. % | 37.7 | 37.7 | 37.7 | 37.7 | 37.7 | 37.7 | 37.7 |
| PFS | A | B | A | A | A | A | A |
| PFS in feed, wt. % | 12.5 | 12.5 | 12.5 | 12.5 | 12.5 | 12.5 | 12.5 |
| Macromer in feed, wt. % | 3.0 | 3.0 | 3.0 | 3.0 | 3.0 | 3.0 | 3.0 |
| CTA in feed, wt. % | 7.5 | 7.5 | 7.5 | 7.5 | 7.5 | 7.5 | 7.5 |
| STY in feed, wt. % | 30.8 | 30.8 | 30.8 | 30.8 | 30.8 | 30.8 | 30.8 |
| ACN in feed, wt. % | 18.8 | 18.8 | 18.8 | 18.8 | 18.8 | 18.8 | 18.8 |
| 150-Mesh filtration, % | 100 | 100 | 100 | 100 | 100 | 100 | 100 |
| Product Properties: | | | | | | | |
| Total polymer (stripped product), wt. % | 55.4 | 56.4 | 54.8 | 54.0 | 54.9 | 54.9 | 54.7 |
| Viscosity, cSt (25° C.) | 4666 | 3626 | 8854 | 6325 | 7722 | 7968 | 11909 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A polymer polyol composition having a solids content of greater than 40% by weight, a total ethylene oxide content of up to 25%, an ethylene oxide content of up to 40% in the base polyol, and a viscosity at 25° C. of less than 15,000 centistokes comprising a reaction product of
    a) at least one base polyol containing active hydrogen atoms having a molecular weight of less than 3500 and a total ethylene oxide content of from 15 to 40 wt. %, and is formed in the presence of a DMC catalyst,
    b) at least one unsaturated monomer in an amount such that the polymer polyol will have a solids content of from 40 to 60 wt. %, and, optionally
    c) a preformed stabilizer, in the presence of;
    d) at least one radical initiator, and optionally
    e) a chain transfer agent.

2. The polymer polyol composition of claim 1 having a solids content of from 40 to 60% by weight.

3. The polymer polyol composition of claim 1 having a solids content of approximately 55% by weight.

4. The polymer polyol composition of claim 1 having a viscosity at 25° C. of less than 10,000 centistokes.

5. The polymer polyol composition of claim 1 in which more than one unsaturated monomer was used in its production.

6. The polymer polyol composition of claim 4 in which styrene and acrylonitrile were used in its production.

7. The polymer polyol composition of claim 1 in which the molecular weight of the base polyol used is less than 3,000 Da.

8. A process for the production of a polymer polyol composition of claim 1 having a solids content of at least 40% by weight, a total ethylene oxide content of up to 25%, an ethylene oxide content of up to 40% in the base polyol, and a viscosity at 25° C. of less than 15,000 centistokes comprising reacting
    a) at least one base polyol containing active hydrogen atoms having a molecular weight of less than 3500 and a total ethylene oxide content of from 15 to 40 wt. % and is formed in the presence of a DMC catalyst,
    b) at least one unsaturated monomer in an amount such that the polymer polyol will have a solids content greater than 40% by weight and, optionally
    c) a preformed stabilizer; in the presence of;
    d) at least one radical initiator, and optionally
    e) a chain transfer agent.

9. The process of claim 8 in which the molecular weight of the base polyol is less than 3,000 Da.

10. The process of claim 8 in which the unsaturated monomer is included in an amount of from 40 to 60% by weight, based on total weight of reaction mixture.

11. The process of claim 8 in which the unsaturated monomer is included in an amount of approximately 55% by weight, based on total weight of reaction mixture.

12. The process of claim 8 in which more than one unsaturated monomer is used.

13. The process of claim 12 in which styrene and acrylonitrile are the unsaturated monomers used.

14. The process of claim 8 in which propylene oxide is included in the reaction mixture.

15. The process of claim 8 in which the at least one unsaturated monomer is chosen from butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, cyanostyrene, phenylstyrene, cyclohexylstyrene, benzylstyrene, nitrostyrene, N,N-dimethylaminostyrene, acetoxystyrene, halogenated styrenes, methyl 4-vinylbenzoate, phenoxystyrene, p-vinyl diphenyl sulfide, p-vinylphenyl phenyl oxide, acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethyoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethylether, vinyl 2-ethylmercapto-ethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, ally alcohol, glycol monoesters of itaconic acid, vinyl pyridine, maleic anhydride, maleimide and N-substituted maleimides.

16. The process of claim 8 in which the radical initiator is chosen from 2,2'-azo-bis-isobutyronitrile (AIBN), 2,2'-azo-bis(2-methylbutanenitrile), dibenzoyl peroxide, lauryl peroxide, di-t-butyl peroxide, diisopropyl peroxide carbonate, t-butyl peroxy-2-ethylhexanoate, t-amyl peroxypivalate, t-butylperneodecanoate, t-butylperbenzoate, t-butyl percrotonate, t-butyl perisobutyrate, and di-t-butyl perphthalate.

17. The process of claim 8 in which the radical initiator is 2,2'-azo-bisisobutyronitrile.

* * * * *